(12) United States Patent
Huetter et al.

(10) Patent No.: US 9,111,162 B2
(45) Date of Patent: Aug. 18, 2015

(54) METHOD, APPARATUS AND STORAGE MEDIUM FOR TWO-DIMENSIONAL DATA STORAGE

(71) Applicant: THOMSON LICENSING, Issy de Moulineaux (FR)

(72) Inventors: Ingo Huetter, Pattensen (DE); Meinolf Blawat, Hannover (DE)

(73) Assignee: THOMSON LICENSING, Issy-Les Moulineaux (FR)

( * ) Notice: Subject to any disclaimer, the term of this patent is extended or adjusted under 35 U.S.C. 154(b) by 0 days.

(21) Appl. No.: 14/273,615

(22) Filed: May 9, 2014

(65) Prior Publication Data

US 2014/0346234 A1    Nov. 27, 2014

(30) Foreign Application Priority Data

May 21, 2013  (EP) .................................... 13305650

(51) Int. Cl.
  *G06K 7/10*     (2006.01)
  *G06K 7/14*     (2006.01)
  *G06K 19/06*    (2006.01)

(52) U.S. Cl.
  CPC ............ *G06K 7/1439* (2013.10); *G06K 7/1404* (2013.01); *G06K 7/1482* (2013.01); *G06K 19/06046* (2013.01)

(58) Field of Classification Search
  USPC ....................................................... 235/454
  See application file for complete search history.

(56) References Cited

U.S. PATENT DOCUMENTS

| | | | |
|---|---|---|---|
| 5,550,362 A * | 8/1996 | Sherman ...................... | 235/455 |
| 5,850,080 A | 12/1998 | Herzig | |
| 7,907,496 B2 | 3/2011 | Hashimoto et al. | |
| 7,957,248 B2 | 6/2011 | Choi et al. | |
| 8,041,123 B2 | 10/2011 | Hashimoto et al. | |
| 2006/0043189 A1 | 3/2006 | Agrawal et al. | |
| 2008/0175127 A1 | 7/2008 | Liedenbaum et al. | |
| 2008/0247010 A1 | 10/2008 | Ogasawara et al. | |
| 2010/0061640 A1 | 3/2010 | Chen et al. | |
| 2012/0281514 A1 | 11/2012 | Ayres et al. | |

FOREIGN PATENT DOCUMENTS

EP    2393038    12/2011

OTHER PUBLICATIONS

The Science and Technology Council: "The Digital Dilemma" Strategic Issues in Archiving and Accessing Digital Motion Picture Materials, 2007, pp. 1-84.
Search Report Dated Oct. 2, 2013.

* cited by examiner

*Primary Examiner* — Jamara Franklin
(74) *Attorney, Agent, or Firm* — Tutunjian & Bitetto, P.C.

(57) ABSTRACT

A method and an apparatus for reading a data pattern from or writing a data pattern to a storage medium are described. During reading a pattern retrieval stage retrieves a test pattern and the data pattern from the storage medium. A decoder, which is trained with pattern elements of the retrieved test pattern by a training stage, decodes the retrieved data pattern by performing a comparison between topologies of the retrieved data pattern and representative patterns derived from the test pattern during training of the decoder.

15 Claims, 6 Drawing Sheets

METHOD, APPARATUS AND STORAGE MEDIUM FOR TWO-DIMENSIONAL DATA STORAGE

This application claims the benefit, under 35 U.S.C. §119 of European Patent Application No. 13305650.7, filed May 21, 2013.

FIELD OF THE INVENTION

The invention relates to a method and an apparatus for reading a data pattern from or storing a data pattern on a storage medium. More specifically, the invention relates to a method and an apparatus for reading a two-dimensional data pattern from or storing a two-dimensional data pattern on a storage medium, which allows to achieve a reduced error rate. The invention further relates to a storage medium suitable for such a method or apparatus for reading a data pattern.

BACKGROUND OF THE INVENTION

Though today there exist a vast variety of solutions for digital data storage, there still is no reliable and accepted solution for long term archival of digital data. Nevertheless there clearly are needs to store digital data for long periods of time, e.g. digital movie data, but also medical data or contractual or client-related data of companies.

One possible solution for long term archival consists in storing the digital data on a two-dimensional surface, e.g. on film or paper. Typically the data are recorded in the form of two-dimensional data patterns consisting of an array of black and white pixels. However, also grey value or color coded pixel arrays are used.

More generally, the data are stored on a two-dimensional surface with pattern elements forming a regular pattern. A specific value is assigned to each element during an encoding process, e.g. a color, a grey value etc. If one pattern element shall store one bit, one of only two possible values is assigned to the pattern element, e.g. the values black and white. The easiest way of decoding the bit stored in a pattern element is to look at the element and to check its value, e.g. if the element is black or white. Unfortunately, due to interference with neighboring pattern elements, e.g. caused by the low pass characteristic of the reading channel, blurring, inter symbol interference, or other distortions like aging, the values of the retrieved pattern elements are often different from the originally stored pattern elements. For example, upon retrieval of the pattern elements the initial values "black" and "white" become "grey". As a result it sometimes is rather difficult to reliably determine the initial values of the pattern elements.

SUMMARY OF THE INVENTION

It is an object of the present invention to propose an improved solution for reading digital data that are stored as an array of pattern elements as well as an improved solution for storing digital data as an array of pattern elements.

According to a first aspect of the invention, a method for reading a data pattern from a storage medium comprises the steps of:
retrieving a test pattern from the storage medium;
training a decoder with test pattern elements of the retrieved test pattern;
retrieving the data pattern from the storage medium; and
decoding the retrieved data pattern with the decoder.

Accordingly, an apparatus configured to read a data pattern from a storage medium comprises:

a pattern retrieval stage configured to retrieve a test pattern from the storage medium and to retrieve the data pattern from the storage medium;
a decoder configured to decode the retrieved data pattern; and
a training stage configured to train the decoder with pattern elements of the retrieved test pattern.

Also, a computer readable storage medium has stored therein instructions enabling reading a data pattern from a storage medium, which when executed by a computer, cause the computer to:
retrieve a test pattern from the storage medium;
train a decoder with pattern elements of the retrieved test pattern;
retrieve the data pattern from the storage medium; and
decode the retrieved data pattern with the decoder.

According to another aspect of the invention, a method for storing a data pattern on a storage medium comprises the steps of:
storing the data pattern on the storage medium;
generating a test pattern comprising a plurality of test pattern elements; and
storing the test pattern on the storage medium.

Accordingly, an apparatus configured to store a data pattern on a storage medium comprises:
an encoder configured to generate the data pattern;
a test pattern generator configured to generate a test pattern; and
a recording stage configured to store the data pattern and the test pattern on the storage medium.

Also, a computer readable storage medium has stored therein instructions enabling storing a data pattern on a storage medium, which when executed by a computer, cause the computer to:
store the data pattern on the storage medium;
generate a test pattern comprising a plurality of test pattern elements; and
store the test pattern on the storage medium.

According to yet another aspect of the invention, a storage medium comprises at least one data pattern and a test pattern comprising a plurality of test pattern elements.

The proposed solution is especially suitable for data patterns forming a two-dimensional array of pattern elements, each pattern element having one of two or more grey values or color values. Such arrays are sometimes referred to as "data pages". It has been found that due to interference with neighboring pattern elements the values of the pattern elements retrieved from a storage medium, e.g. a film, are often different from the originally stored pattern elements. To address this problem a test pattern is provided on the storage medium, which includes a plurality of test pattern elements. Each test pattern element of the test pattern has a center element surrounded by some neighbor elements, e.g. all eight neighbors or four direct neighbors. One possibility is to store individual test pattern elements, i.e. individual blocks each comprising one center element and the necessary neighbors. The same test pattern element is preferably provided several times to allow some kind of averaging. Alternatively, the test pattern elements form a single two-dimensional array of pattern elements. This means that the different test pattern elements overlap, i.e. most pattern elements serve as center elements as well as neighbors for other center elements.

For decoding of a pattern element some or even all pattern elements around the one that shall be decoded are also taken into account. The decoder tries to find the initial value of the pattern element, or rather the bit assigned to this value, by creating a topology. Based on the appearance of the topology in comparison with the test pattern elements a decoding decision is taken.

With the proposed solution the decoding error rate is much less than by looking at the related pattern element values only. At the same time it is simpler to implement than other methods, which perform the decoding by relying on complex statistical models.

Advantageously, one of the data patterns stored on the storage medium serves as the test pattern. Generally error correction coding is used in data storage, e.g. FEC (FEC: Forward Error Correction) such as a Reed-Solomon block code. This error correction coding allows to omit a special test pattern as long as the number of reading errors is sufficiently small and the data can be decoded. In this case the data patterns are read and demodulated. The resulting demodulated data are error-corrected, e.g. with the help of a Reed-Solomon decoder. If this is successful, i.e. if the number of decoding errors is sufficiently small, the originally read data pattern can then be used for training, as the actual pattern stored on the storage medium is known from the error corrected data.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

In the following the invention is explained with reference to a two-dimensional array of black and white pixels. Of course, the invention is likewise applicable to pixels with different grey values or different colors, i.e. to coding schemes resulting in more than one bit per pixel.

Data are stored by creating two-dimensional patterns that are written to a surface or a layer of a storage medium. These patterns consist of pattern elements, which are ordered in a specific way, e.g. as a chequerboard or honeycomb pattern. Each pattern element is used to store digital data. Depending on the number of bits that shall be stored by one element, the pattern element must be able to represent a corresponding number of values. As an example, if one bit shall be stored per pattern element, the pattern element must be able to assume two different values, e.g. "black" and "white". If it shall store three bits, it must be able to assume eight different values, e.g. eight different grey values or eight different colors.

Figure 1:
FIG. 1 shows an original two-dimensional pattern of data elements.
Figure 2:
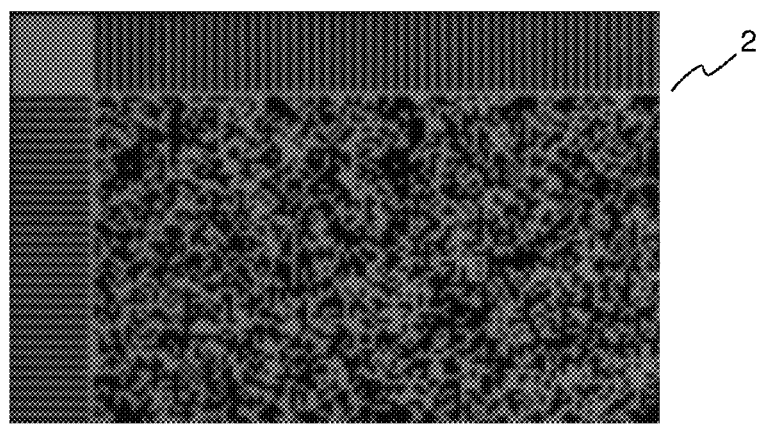
FIG. 2 shows a data pattern retrieved by scanning the original data pattern of FIG. 1.

FIGS. 1 and 2 show an example of a two-dimensional pattern of data elements, where data are encoded as black and white values. FIG. 1 depicts a detail of the original data pattern 1, FIG. 2 a detail of the same data pattern 2 retrieved by scanning the original data pattern 1 from a storage medium. The horizontal and vertical bars at the edge of the data pattern 1 are used for correcting alignment of the retrieved data pattern 2. It is clearly visible in this example that standalone black pattern elements are much brighter after scanning. It may even happen that a standalone black pattern element is brighter than a standalone white pattern element, i.e. a white pattern element surrounded by black pattern elements. This will eventually lead to a decoding error.

Additional distortions will typically occur, e.g. due to scratches and dirt. Such distortions can also arise due to the used channel, which is an abstraction for the influence of the printing process, the ageing of the material and the scanning process. Especially if the size of one pattern element is very small, which is generally required to store a big amount of data, the problem of interference between the single pattern elements arises.

In order to cope with the above problems, the solution according to the invention makes use of a test pattern recorded on the storage medium. The test pattern consists of a deterministic pseudo random distribution of test pattern elements. This ensures that the distribution of printed values is known during an initial learning phase.

Figure 3:
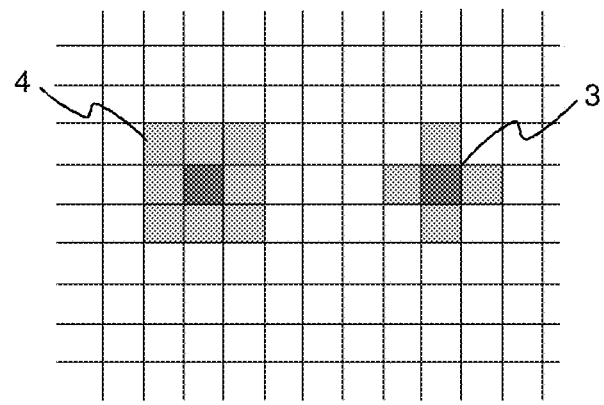
FIG. 3 defines a center pattern element and satellite pattern elements of a data pattern.

FIG. 3 defines a center pattern element and satellite pattern elements of a data pattern. As readout of each addressed pattern element of the data pattern is influenced by the pattern elements surrounding the addressed pattern element, it is necessary to first decide which pattern elements around the pattern element of interest, the so called "center pattern element" 3, are also considered. These surrounding pattern elements are called "satellite pattern elements" 4. As illustrated in FIG. 3, for a data pattern of squares it is most appropriate to look at either the eight neighbors in all directions or the four direct neighbors. For encoding one bit each pattern element has one of two intended values, e.g. black and white. In this case, when the eight neighbor pattern elements are considered, there exist $2^9=512$ possible combinations of input signals.

Figure 4:
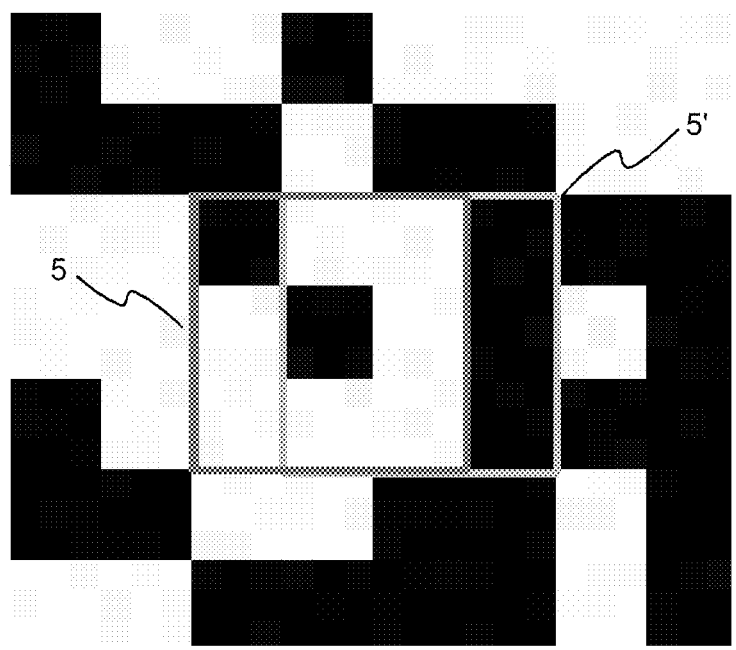
FIG. 4 depicts an array of overlapping test pattern elements.

An example how overlapping test pattern elements 5, 5' form a two-dimensional array is illustrated in FIG. 4. As can be seen from the figure, the black center element of a first test pattern element 5 simultaneously serves as a neighbor pattern element for the white center element of a second test pattern element 5'. In this way an array of test pattern elements is formed, which does only need a reduced amount of storage space on the storage medium. Generally a large array will contain each necessary test pattern element multiple times.

Figure 5:
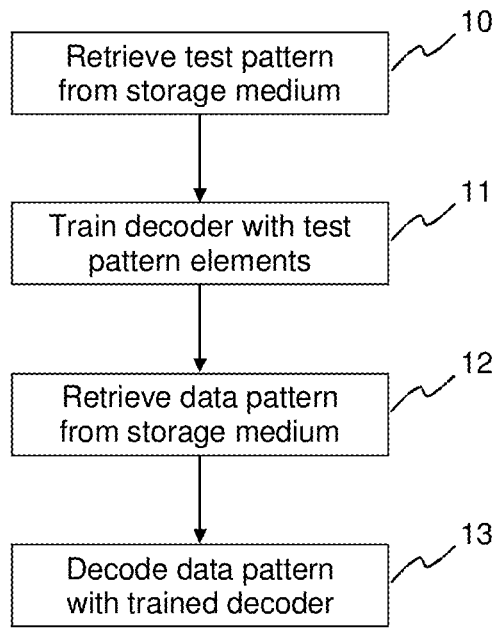
FIG. 5 illustrates a method according to the invention for reading a data pattern from a storage medium.

FIG. 5 schematically illustrates a method according to the invention for reading a data pattern 1 from a storage medium 25. In a first step a test pattern is retrieved 10 from the storage medium 25. The test pattern elements of the retrieved test pattern are then used for training 11 a decoder 22, as will be explained below in more detail with reference to FIG. 8. When training is completed the data pattern 1 is retrieved 12 from the storage medium 25 and decoded 13 with the trained decoder 22. Of course, it is likewise possible to first retrieve 12 the data pattern, store the retrieved data pattern in a memory, and only then retrieve 10 the test pattern.

Figure 6:
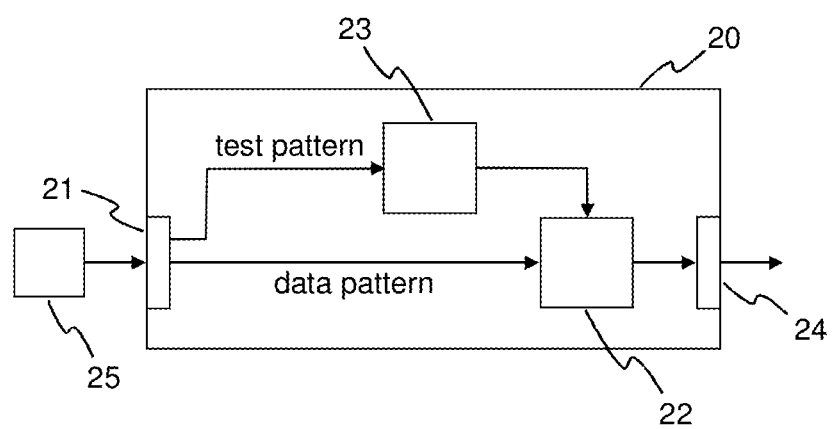
FIG. 6 depicts an apparatus implementing the method of FIG. 5.

A corresponding apparatus 20 is shown in FIG. 6. The apparatus 20 has a pattern retrieval stage 21 for retrieving 10 a test pattern from a storage medium 25 and for retrieving 12 the data pattern from the storage medium 25. The retrieved test pattern is provided to a training stage 23, which trains 11 a decoder 22 with pattern elements of the retrieved test pattern. The retrieved data patterns are provided to the decoder 22, which decodes 13 the data pattern and outputs the decoded data via an output 24.

Figure 7:
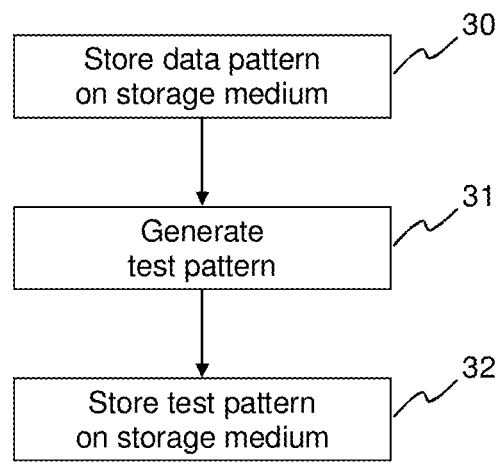
FIG. 7 illustrates a method according to the invention for writing a data pattern to a storage medium.

A method according to the invention for writing a data pattern to a storage medium is schematically shown in FIG. 7. After storing 30 the data pattern on the storage medium 25, a test pattern comprising a plurality of test pattern elements is generated 31. This test pattern is then also stored 32 on the storage medium 25. Typically the complete test pattern or parameters to be used for generating the different test pattern elements will be available in a memory of an apparatus used for writing the data pattern. Also, it is likewise possible to store 32 the test patterns before storing 30 the data pattern.

Figure 8:
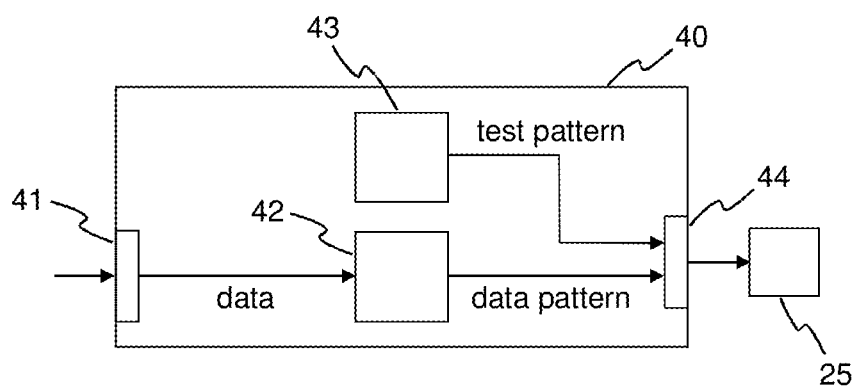
FIG. 8 depicts an apparatus implementing the method of FIG. 7.

A corresponding apparatus 40 is depicted in FIG. 8. The apparatus 40 has an input 41 for receiving the data to be stored. An encoder 42 generates the actual data pattern to be stored on the storage medium 25. A test pattern generator 43 generates 31 a test pattern to be stored on the storage medium 25. The data pattern and the test pattern are stored 30, 32 on the storage medium 25 by a recording stage 44.

Figure 9:
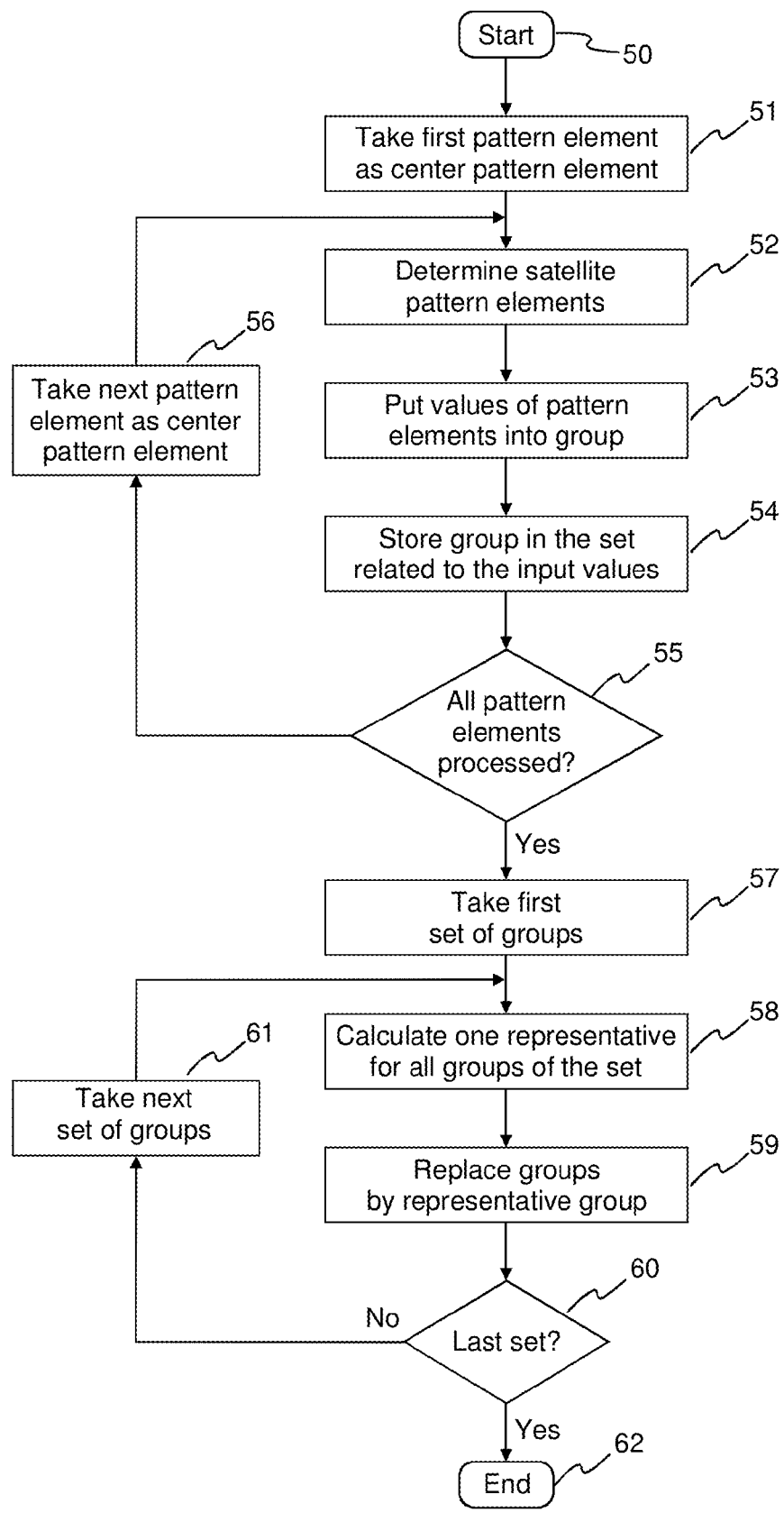
FIG. 9 shows the training of the decoder in more detail.

FIG. 9 illustrates the steps performed during the initial training step 11 in more detail. After starting 50 the training procedure, a first pattern element is taken 51 as the center pattern element. Then the satellite pattern elements are determined 52, i.e. measured, and the measured values are put 53 into a group. The complete group is stored 54 in a set related to the input values. It is then determined 55 whether all pattern elements have been processed. If this is not the case, the next pattern element is taken 56 as the center pattern element and the procedure is repeated.

In other words, using the test pattern for training, for each possible input combination, i.e. the center pattern element and the satellite pattern elements containing all possible input values according to the bit depth that shall be used, the related values of the pattern elements on the decoding side are measured. This is preferably repeated several times, i.e. as often as a test pattern element is present in the test pattern. In this way for each input combination a plurality of groups of measured values are obtained. In the example presented before, i.e. each pattern element having two possible values and considering the eight neighbor pattern elements, there are 512 sets of groups consisting of nine values. Each group represents a topology.

In the following for all sets of groups one representative group is calculated. After taking 57 a first set of groups one representative for all the groups of the set is calculated 58, e.g. by computing the mean values of the set's group elements, which represents the typical decoding side values for this combination. The representative group replaces 59 the groups of this set. It is then checked 60 whether further sets need to be processed. If this is the case, the next set of groups is taken 61 and the calculation is repeated. This is repeated until all sets of groups have been processed, in which case the training step ends 62.

Figure 10:
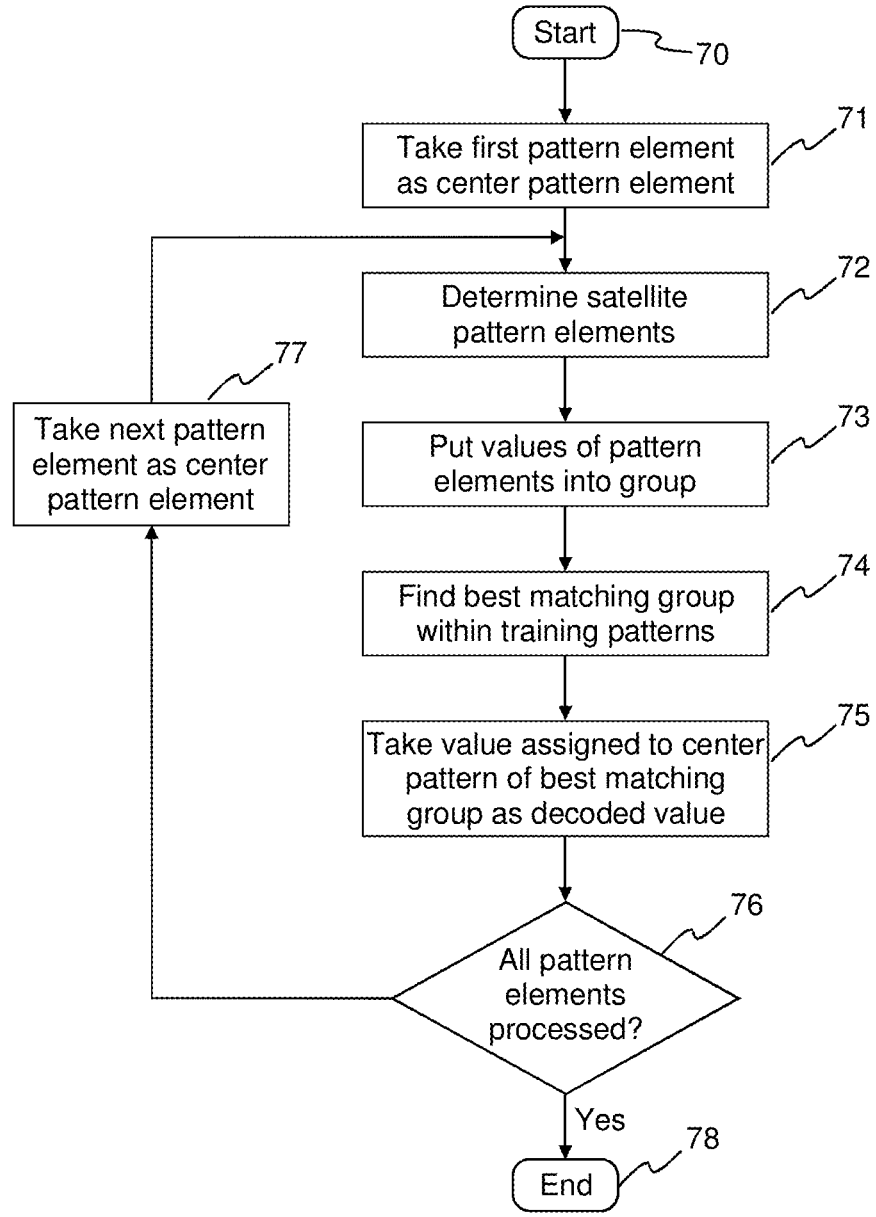
FIG. 10 illustrates decoding of the data pattern in more detail.

After the training 11, the decoding 13 is started. The steps performed during decoding 13 are shown in more detail in FIG. 10 Decoding is based on the general idea that the center pattern element and the satellite pattern elements form a topology and that decoding can be improved by comparing the topology for each pattern element with all reference topologies.

When decoding of a pattern element is started 70, this pattern element is considered 71 as the center pattern element. For this pattern element and the related satellite pattern elements the group of values at the decoding side is determined 72. The measured values of the pattern elements are then put 73 into a group. The values of this group are compared 74 with all groups determined during the training using a specific comparison algorithm, e.g. minimum mean square distance. The best matching group of values is assumed to be the right one that leads to the decoding side signal. The source bits assigned to the center pattern element of the best matching group are taken 75 as decoded bits. This method is repeated 76, 77, 78 until all pattern elements have been decoded.

The above description explains the basic algorithm. Of course, this algorithm may be modified depending on the actual implementation. For example, in the discussed example each pattern element encodes one bit. The same algorithm can be used for higher modulations, which leads to larger sets of groups. Also, instead of calculating the mean square difference for comparing the values of the measured group with the training groups, other algorithms are also possible. Especially weighting the distance between the center pattern element values more than the distances between the satellite pattern elements can lead to better results. Another modification consists in not automatically choosing the best matching group for decoding, but to determine a number of "n" best matching groups. A majority decision based on the bits assigned to the center pattern elements of the groups may then be performed. Finally, it is not mandatory to represent all groups of a set m by only one group. If the topologies represented by the groups differ a lot, it might be advantageous to calculate several groups representing the input values of the set of groups.

What is claimed is:

1. A method for reading a data pattern from a storage medium, the method comprising:
   retrieving a test pattern from the storage medium;
   training a decoder with test pattern elements of the retrieved test pattern;
   retrieving the data pattern from the storage medium; and
   decoding the retrieved data pattern with the decoder by performing a comparison between topologies of the retrieved data pattern and representative patterns derived from the test pattern during training of the decoder.

2. The method according to claim 1, wherein the data pattern is a two-dimensional array of pattern elements, each pattern element having one of two or more grey values or color values.

3. The method according to claim 1, wherein the storage medium is a film.

4. The method according to claim 1, wherein each test pattern element of the test pattern comprises a center element surrounded by eight neighbors or four direct neighbors.

5. The method according to claim 1, wherein a retrieved data pattern serves as the test pattern.

6. An apparatus configured to read a data pattern from a storage medium, wherein the apparatus comprises:
   a pattern retrieval stage configured to retrieve a test pattern from the storage medium and to retrieve the data pattern from the storage medium;
   a decoder configured to decode the retrieved data pattern by performing a comparison between topologies of the retrieved data pattern and representative patterns derived from the test pattern during a training of the decoder; and
   a training stage configured to train the decoder with pattern elements of the retrieved test pattern.

7. A non-transitory computer readable storage medium having stored therein instructions enabling reading a data pattern from a storage medium, wherein the instructions, when executed by a computer, cause the computer to:
  retrieve a test pattern from the storage medium;
  train a decoder with pattern elements of the retrieved test pattern;
  retrieve the data pattern from the storage medium; and
  decode the retrieved data pattern with the decoder by performing a comparison between topologies of the retrieved data pattern and representative patterns derived from the test pattern during training of the decoder.

8. The apparatus according to claim 6, wherein the data pattern is a two-dimensional array of pattern elements, each pattern element having one of two or more grey values or color values.

9. The apparatus according to claim 6, wherein the storage medium is a film.

10. The apparatus according to claim 6, wherein each test pattern element of the test pattern comprises a center element surrounded by eight neighbors or four direct neighbors.

11. The apparatus according to claim 6, wherein a retrieved data pattern serves as the test pattern.

12. The non-transitory computer readable storage medium according to claim 7, wherein the data pattern is a two-dimensional array of pattern elements, each pattern element having one of two or more grey values or color values.

13. The non-transitory computer readable storage medium according to claim 7, wherein the storage medium is a film.

14. The non-transitory computer readable storage medium according to claim 7, wherein each test pattern element of the test pattern comprises a center element surrounded by eight neighbors or four direct neighbors.

15. The non-transitory computer readable storage medium according to claim 7, wherein a retrieved data pattern serves as the test pattern.

* * * * *